(12) United States Patent
Singh et al.

(10) Patent No.: US 12,717,549 B2
(45) Date of Patent: Aug. 25, 2026

(54) SYSTEM AND METHOD FOR ENTERPRISE SOFTWARE SUPPLY CHAIN SECURITY

(71) Applicant: Guardian Life Insurance Company of America, New York, NY (US)

(72) Inventors: Manas Singh, Chappaqua, NY (US); Daniel Johnson, Slingerlands, NY (US)

(73) Assignee: Guardian Life Insurance Company of America, New York, NY (US)

( * ) Notice: Subject to any disclaimer, the term of this patent is extended or adjusted under 35 U.S.C. 154(b) by 133 days.

(21) Appl. No.: 18/403,226

(22) Filed: Jan. 3, 2024

(65) Prior Publication Data

US 2025/0217113 A1 Jul. 3, 2025

(51) Int. Cl.
*G06F 8/10* (2018.01)
*G06F 16/27* (2019.01)

(52) U.S. Cl.
CPC ................ *G06F 8/10* (2013.01); *G06F 16/27* (2019.01)

(58) Field of Classification Search
CPC ................................... G06F 8/10; G06F 16/27
USPC ................................................... 717/101–103
See application file for complete search history.

(56) References Cited

U.S. PATENT DOCUMENTS 11,106,458 B2 * 8/2021 Adams ...................... G06F 8/71
2018/0167198 A1 6/2018 Muller et al.
2019/0303579 A1 * 10/2019 Reddy ................... H04L 9/3239
2019/0303623 A1 * 10/2019 Reddy ........................ G06F 8/71
2019/0305957 A1 * 10/2019 Reddy ........................ G06F 8/60
2019/0305959 A1 10/2019 Reddy et al.

OTHER PUBLICATIONS

Hyperledger, “Writing Your First Application”, 2019, https://hyperledger-fabric.readthedocs.io/en/release-1.4/ , 13 pages. (Year: 2019).*
Hyperledger, “Commercial paper tutorial”, 2019, https://hyperledger-fabric.readthedocs.io/en/release-1.4/ , 24 pages. (Year: 2019).*
Hyperledger, “Building Your First Network”, 2019, https://hyperledger-fabric.readthedocs.io/en/release-1.4/ , 27 pages. (Year: 2019).*
(Continued)

*Primary Examiner* — Ted T. Vo
(74) *Attorney, Agent, or Firm* — Carter, Ledyard & Milburn LLP

(57) ABSTRACT

A system and method for securing an enterprise’s software supply chain includes an enterprise, a build artifact, and a metadata extractor. The metadata extractor is configured to extract metadata from the build artifact and send the metadata to an enhanced software bill of materials generator. The enhanced software bill of materials generator may generate a software bill of materials based on the metadata. A know your software large language model (“KYS LLM”) is also provided. The KYS LLM is configured to be trained by the metadata and to receive a query from an actor. An enterprise blockchain is provided and may receive the metadata and a query. The enterprise blockchain may include an application programming interface configured to initiate a download of dependencies from the enterprise blockchain. A pipeline may be provided to receive the download of the dependencies from enterprise blockchain and deploy information from the download.

11 Claims, 8 Drawing Sheets

(56) References Cited

OTHER PUBLICATIONS

Nyaletey et al., "BlockIPFS—Blockchain-enabled Interplanetary File System for Forensic and Trusted Data Traceability", 2019, IEEE, PLOS ONE, pp. 18-25. (Year: 2019).*
Alchemy, "What is an ABI of a Smart Contract?", 2022, retrieved from https://www.alchemy.com/overviews/what-is-an-abi-of-a-smart-contract-examples-and-usage , 6 pages. (Year: 2022).*
Xia et al., "Trust in Software Supply Chains: Blockchain-Enabled SBOM and the AIBOM Future", Jul. 2023, arXiv, 13 pages. (Year: 2023).*
Francesco Longo, Blockchain-enabled supply chain: An experimental study, Computers & Industrial Engineering, Oct. 2019, pp. 57-69, vol. 136, United States.
Michael Mylrea and Sri Nikhil Gupta Gourisetti, Blockchain for Supply Chain Cybersecurity, Optimization and Compliance, 2018 Resilience Week, 2018, pp. 70-76, IEEE, doi: 10.1109/RWEEK.2018.8473517, Denver, CO, USA.

* cited by examiner

```
pragma solidity ^0.8.0;

struct Vendor {
    string name;
    address addr;
}

struct Asset {
    string cid;
    string name;
    string size;
}

struct Package {
    string name;
    string version;
    address addr;
    Vendor vendor;
    uint releaseDate;
}

interface Registry {
    function getAssets(string memory_name, string
memory_version) external view returns (Asset[ ] memory);
    function getPackageReleases(string memory_name)
external view returns (Package[ ] memory);
    function getAllPackages() external view returns
(Package[ ] memory);
```

```
{
      "_format": "hh-sol-artifact-1",
"contractName": "Registry",
"sourceName": "contracts/
Registry.sol", "address":
"0x5FbDB2315678afecb367f032d93F642f64180aa
3",   "abi": [
{
          "name": "addPackage",
          "type": "function",
          "stateMutability": "
          nonpayable",      "inputs": [
               {
                    "internalType": string",
                    "name": "_name",
                    "type": string"
               },
               {
                    "internalType": string",
                    "name": "_vendorName",
                    "type": string"
               },
               {
                    "internalType": "string [ ]
                    [ ]", "name": "_assets",
                    "type": "string [ ] [ ]"
               }
          ]
```

Figure 4

```
package_name: cutomerhub
ipfs_content_identiÿer:
    QmdK5EyBcCGRXL7gw87qMMA4EEgJxJi9YmkSQ
license: GPLv3
timestamp: 1699041295192
enhanced_sbom:
    vulnerability_score: 9.56
    dependencies:
    -   name: log4j-core
        version: 2.15.0
        cves:
        -   id: CVE-2021-44228
            severity: HIGH
            impact_score: 10.0
        kevs:
        -   cveID: CVE-2021-44228
            vendorProject: Apache
            product: Log4j2
            vulnerabilityName: Apache Log4j2
                Remote Code Execution Vulnerability
        epss:
        -   cve: CVE-2021-44228
            epss: 0.974530000
            percentile: 0.999420000
            date: 2023-10-28
```

SYSTEM AND METHOD FOR ENTERPRISE SOFTWARE SUPPLY CHAIN SECURITY

TECHNICAL FIELD

This disclosure relates to a system and method for securing a software supply chain, and, more particularly, to a system and method for securing a software supply chain for an enterprise by leveraging blockchain and large language models ("LLM") through a "Know Your Software" ("KYS") approach.

BACKGROUND

The contemporary software development landscape is characterized by a complex and interconnected supply chain involving multiple contributors, repositories, third party, opensource and distribution points.

Software supply chain security refers to the measures and practices implemented to protect the integrity, confidentiality, and availability of software throughout its development, distribution, and deployment lifecycle. It aims to prevent and mitigate security threats and vulnerabilities that can be introduced at any stage of the software supply chain. This is crucial because a compromised software supply chain can lead to significant security breaches and vulnerabilities. This concept has gained significant attention in recent years due to the increasing complexity of software ecosystems and the growing number of cyberattacks targeting the software supply chain.

However, the existing approaches for securing software supply chain has key challenges like lack of transparency, limited traceability and lineage, insufficient verification mechanisms, and complexity in dependency management and insecure development practices.

An experimental study was conducted regarding blockchain-enabled supply chain. ("Blockchain-enabled supple chain: An experimental study," Longo et al., Computers & Industrial Engineering 136 (2019) 57-69). In the study, an Ethereum-like blockchain is connected with enterprises' information systems to allow companies to share information with their partners with different levels of visibility, and to check data authenticity, integrity, and invariability over time, through the blockchain, thus building trust. The results concluded using blockchain technology is a convenient instrument to overcome collaboration and trust issues in a supply chain.

U.S. Patent Publication No. 2018/0167198 discloses configuring one or more servers to execute blockchain software for a blockchain software for a blockchain that tracks ownership and usage or software. Each transaction of the blockchain includes an asset identifier that identifies a particular device or instance of software and an owner identifier.

U.S. Patent Publication No. 2019/0305959 discloses the use of smart contracts to announce software release, wherein respective instances of the program are configured to publish release documentation by which instances of the software asset is verifiable to the blockchain, and respective instances of the program are configured to verify cryptographic signature Associated with the software.

Blockchain for Supply Chain Cybersecurity, Optimization and Compliance discloses blockchain technology to enable North American Electric Reliability Corporation Critical Infrastructure Protection compliance as well as aid in the security of the Belk Electric System supply chain through cryptographically signed distributed ledger.

SUMMARY OF THE DISCLOSURE

In one implementation, a system for securing an enterprise's software supply chain includes an enterprise; a build artifact; a metadata extractor configured to extract metadata from the build artifact and send the metadata to an enhanced software bill of materials generator; a know your software large language model configured to be trained by the metadata and to receive a query from an actor; an enterprise blockchain configured to receive the metadata and to receive a query from the actor, wherein the enterprise blockchain comprises an application programming interface configured to initiate a download of dependencies from the enterprise blockchain; and a pipeline configured to receive the download of dependencies from the enterprise blockchain and to deploy information from the download of dependencies from the enterprise blockchain.

One or more of the following features may be included. The metadata extractor may include the enhanced software bill of materials generator. The enterprise blockchain may include a package archiver via the metadata extractor. The enterprise blockchain may include an InterPlanetary File System configured to send and receive a content identifier. The enterprise blockchain may include an application programming interface ("API") configured to publish the content identifier to the enterprise blockchain; an application binary interface ("ABI") configured to receive the contract instance and specify rules for data representation; a bytecode module configured to deploy code to a blockchain; an address configured to be located and executed within the blockchain; or a smart software supply chain contract configured to compile code.

In another implementation, a method for securing an enterprise's software supply chain includes providing an enterprise build artifact; a metadata extractor; a package archiver; an InterPlanetary File System; a smart software supply chain contract; a know your software large language model; and a blockchain. The method may further include sending the enterprise build artifact to the metadata extractor, extracting metadata of the enterprise build artifact, training the know your software large language model with extracted metadata, generating a package manifest, sending extracted metadata to the package archiver, archiving the extracted metadata into the InterPlanetary File System via the package archiver, generating a content identifier based on the archiving of the extracted metadata, inserting the content identifier into the smart software supply chain contract, recording the content identifier's insertion into the smart software supply chain contract into the blockchain, querying the know your software large language model to search for and generate library recommendations, and querying the blockchain to search for content identifiers and aspects of the smart software supply chain contract inputted into the blockchain.

One or more of the following features may be included. The method may further comprise halting the smart software supply chain contract.

BRIEF DESCRIPTION OF THE DRAWINGS

Various embodiments in accordance with the present disclosure will be described with reference to the drawings, in which:

FIG. 3 illustrates an example of a Solidity smart contract that may be used in the present disclosure;

FIG. 4 illustrates an example of an Application Binary Interface (ABI) that maybe used in the present disclosure;

FIG. 6 illustrates an example of a Package Manifest that may be used in the present disclosure;

FIG. 7 illustrates an example of a Package Registry Dashboard that may be used in the present disclosure.

DETAILED DESCRIPTION OF THE PREFERRED EMBODIMENTS

The present disclosure includes a system and method for securing a software supply chain for an enterprise through leveraging a blockchain and an LLM for a KYS approach. The blockchain may be a decentralized and distributed digital ledger which records transactions across a network of computers in a secure and transparent manner. The blockchain may be a permissioned blockchain with an access control layer enabled to allow external enterprises or vendors to be invited into the blockchain's software environment. The system may employ a provided, permissioned blockchain (e.g., not publicly accessible) to ensure that only authorized participants can access and contribute to the distributed ledger. A smart software security supply chain contract for the blockchain may be provided by a human author or other contract-generating software, automated, and enforce predefined rules and ensure the quality, unique identity, and reliability of the software supply chain. The present disclosure implements KYS mechanisms using the principles of "Know Your Customer" ("KYC"). Each software component is identified, verified, and enhanced with relevant metadata such as a software Bill of Materials ("sBOM"), data regarding the version of the software, software dependencies, a digital signature, etc. The KYS LLM may be trained with the software components' metadata.

Figure 1:
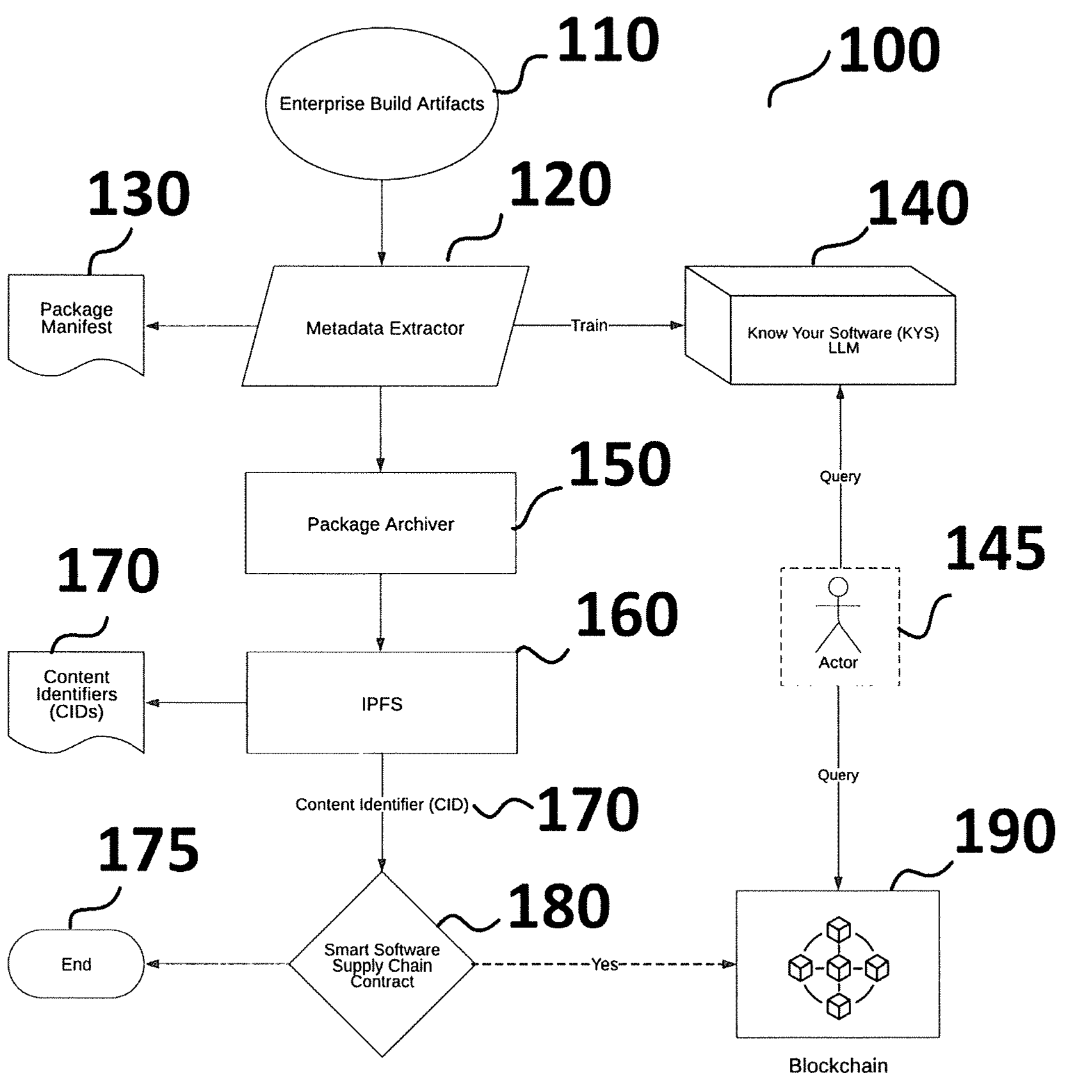
FIG. 1 illustrates a flowchart for an exemplary workflow method of securing software supply chains for an enterprise.

Referring to FIG. 1, there is shown an exemplary flowchart for a method workflow 100 of the present disclosure for securing a software supply chain for an enterprise. Enterprise build artifacts may be provided (numeral 110) by third-party enterprises or third-party vendors. One or more enterprises may build one or more artifacts. The enterprise build artifacts may be documents which provide views of an organization. The enterprise build artifacts may also be outputs of a build process, which can be used for deployments, debugging, and viewing test suite coverage. The enterprise build artifacts may be submitted to a provided metadata extractor (numeral 120). The metadata extractor may be a tool that analyzes digital files and retrieves metadata (both hidden and unhidden) contained within the digital files. The metadata extractor may scan a file or a set of files and identify metadata embedded therein. The metadata extractor may also extract and analyze information pertinent to compliance, provenance, governance, and vulnerabilities of the one or more enterprise build artifacts. The metadata extractor may provide or output metadata information as a package manifest (numeral 130).

The package manifest may contain crucial information about one or more enterprise build artifacts. The package manifest may be a YAML file or an XML document, for example. The package manifest may be a document that provides detailed information, such as license information, and an enhanced sBOM with a vulnerability score incorporating: a Common Vulnerabilities and Exposures ("CVE") system, Known Exploited Vulnerabilities ("KEVs"), and an Exploit Prediction Scoring System ("EPSS") of dependencies. KEVs refer to vulnerabilities in software, hardware, applications, or systems that are actively being exploited by threat actors. The Cybersecurity and Infrastructure Security Agency ("CISA") maintains an authoritative source of vulnerabilities that have been exploited in the wild, known as the Known Exploited Vulnerabilities Catalog. EPSS is a data-driven effort for estimating the likelihood (probability) that a software vulnerability will be exploited in an environment outside of a local network. The EPSS model may produce a probability score between 0 and 1 (0 and 100%). The higher the score, the greater the probability that a vulnerability will be exploited.

The metadata extractor may train a provided KYS LLM (numeral 140). The metadata extractor may automatically send its contents and/or the package manifest to the KYS LLM. Training may be automated through a trigger. The trigger may include the completed generation of the package manifest or a trigger administered by a user of method 100.

The KYS LLM may be an advanced artificial intelligence model designed to understand and generate human-like text at scale. KYS may refer to the understanding of software one is using or developing. KYS LLM may combine capabilities in advanced artificial intelligence with contextual objectives guided by KYS principles. KYS principles may include understanding the functionality of particular software; knowing requirements; understanding code; understanding updates and patches; and/or understanding terms of use and privacy policies. The KYS LLM may assist the actor with understanding the remaining components of method 100 (e.g., via queries), which will be further explained below.

The metadata extractor may train the LLM with, for example, extracted metadata. Training may occur in several steps, including feeding data into the KYS LLM, feeding parameters into the KYS LLM, repeating exercises to minimize error, evaluating the performance of KYS LLM in consideration of one or more specific objectives, and comparing the performance across time and/or between training sessions.

The metadata extractor may send files or other documents (e.g., containing extracted metadata and/or content of the package manifest) to a package archiver (numeral 150). The package archiver may compress and combine whatever it receives into a single archive file capable of being uploaded to and archived within a provided InterPlanetary File System ("IPFS") (numeral 160). IPFS may be a decentralized and distributed protocol designed to create a peer-to-peer method of storing and sharing media in a distributed file system. The IPFS may use content-addressing to uniquely identify each file in a global namespace connecting IPFS hosts.

IPFS may be used with the package archiver. For instance, the IPFS may use Content Addressable Archive ("CAR") files to store and transfer a serialized archive of InterPlanetary Linked Data ("IPLD"), which may be content-addressed data. Overall, IPFS may be a useful system for storing, searching for, archiving, and transferring certain data and/or files.

Every item added to the IPFS may be given a unique address derived from a hash of the item's content. This address may be called as a Content Identifier ("CID"). CIDs may also be cryptographic hashes which uniquely represent content data and structure. The IPFS may be responsible for creating CIDs (numeral 170) in method 100. IPFS may also be responsible for uniquely identifying and retrieving files, including CIDs.

A user or actor (numeral 145) may query the KYS LLM. For example, the actor may query the KYS LLM with a natural language prompt. For example, a prompt the user may include could contain, "I want a library to do security operations in Python with as low of a vulnerability score as possible." The KYS LLM may then generate a library recommendation imparting to the actor one or more libraries containing security operations, having Python code, each having low vulnerability scores. The actor may then query the blockchain, shown in method 100 (numeral 190), to determine whether the blockchain contains anything resembling the library recommendation. The actor may then implement the library recommendation in a component of the blockchain. The blockchain may include a smart contract or another software supply chain component, both of which could have the library recommendation implemented thereto.

The IPFS may facilitate insertion of one or more content identifiers into a provided smart software supply chain contract (numeral 180). The smart software supply chain contract may be a program that runs on the blockchain. The smart software supply chain contract may also automatically enforce and execute predefined rules and conditions given either by the actor or another software file (e.g., a text file). The smart software supply chain contract may record insertions of material into one or more contracts underlying it. Predefined rules and conditions may be provided by parties involved in the contract. Development of the smart software supply chain contract may be done via Solidity, a programming language specifically designed for developing smart contracts. The smart software supply chain contract may be authored by a human being or by another software component not shown in FIG. 1.

The smart software supply chain contract may end method 100 (numeral 175) if one or more conditions are met. For example, if the one or more CIDs provided by the IPFS to the smart software supply chain contract does not identify or refer to any component in compliance with the predefined rules and conditions, then the smart software supply chain contract may end method 100. If the smart software supply chain contract has predefined rules and conditions satisfied by information associated with the one or more content identifiers, then the smart software supply chain contract may execute one or more actions, such as filing the one or more content identifiers into the blockchain; executing at least a portion of the one or more contracts underlying the smart software supply chain contract; or recording how the one or more content identifiers satisfy the predetermined rules and conditions. The one or more content identifiers may also be made available to third-party enterprises via their access to the blockchain. Following one or more of these executed actions, the actor may query the blockchain regarding the executed actions or query the blockchain to locate the one or more content identifiers which satisfied the predetermined rules and conditions. Contents of the blockchain may be used by the actor to query or train the KYS LLM.

Figure 2:
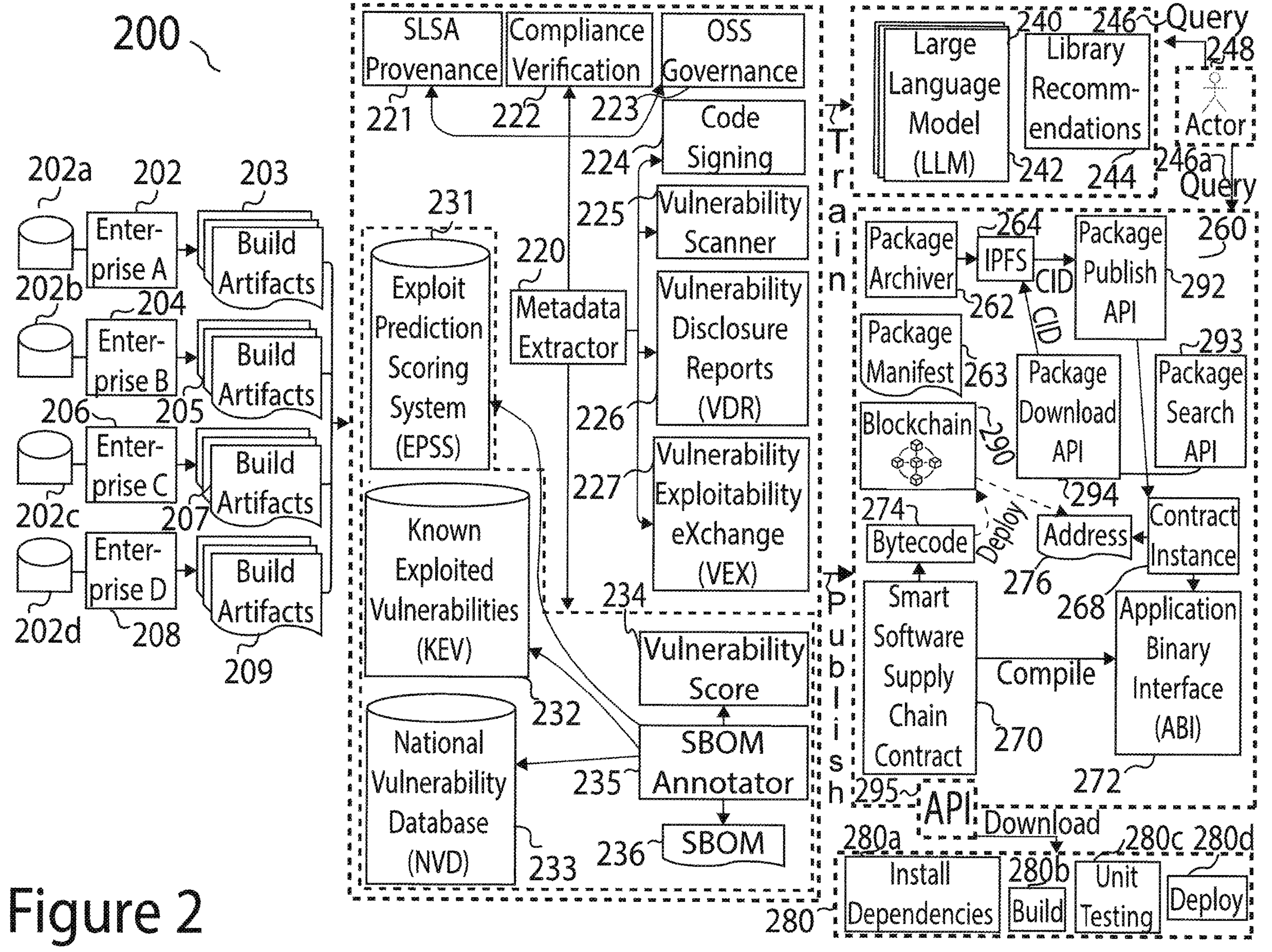
FIG. 2 illustrates an example of a system for securing a software supply chain for an enterprise.

Referring to FIG. 2, there is shown a system 200 for securing a software supply chain for an enterprise. System 200 may include a metadata extractor 220, an enhanced sBOM Generator 230, a KYS LLM 240, an enterprise blockchain 260 and a continuous integration and continuous delivery ("CI/CD") pipeline 280.

For example. enterprises/vendors A through D (202, 204, 206, and 208) may provide respective build artifacts 203, 205, 207, 209 and upload these build artifacts to metadata extractor 220. Metadata extractor 220 may resemble the metadata extractor described in method 100. Metadata extractor 220 extracts and analyzes an SLSA provenance 221, a compliance verification 222, a OSS governance 223, a code signing 224, and vulnerabilities information (through processes of a vulnerability scanner 225, Vulnerability Disclosure Reports 226, and Vulnerability Exploitability exchange 227) from the uploaded artifacts 203, 205, 207, 209. That is, metadata extractor 220 may analyze various types of metadata from uploaded build artifacts 203, 205, 207, and 209. Analyses of metadata may involve reading EXIF, IPTC, XMP, and other metadata standards. Metadata extractor 220 may particularly analyze build artifacts 203, 205, 207, and 209 by analyzing SLSA ("supply-chain levels for software artifacts") provenance metadata 221 (i.e., the verifiable information about the build artifacts 203, 205, 207, and 209 describing where, when, and how their components were produced). SLSA provenance 221 may track and document the origins and changes made to uploaded software artifacts 203, 205, 207, 209 throughout their lifecycle. SLSA provenance 221 may provide a framework to enhance security and transparency of software supply chains. For example, SLSA provenance 221 may enable metadata extractor 220 to understand the origin and production process of build artifacts 203, 205, 207, and 209. Metadata extractor may generate SLSA provenance 221. Metadata extractor 220 may employ compliance verification 222 to ensure that items from build artifacts 203, 205, 207, and 209 (which may include systems, processes and/or entities) adhere to the established rules, standards and/or regulations, such as HIPAA, DSS-PCI, GDPR, etc. Compliance verifications 222 may be a formal, mandatory compliance review of metadata extracted from build artifacts 203, 205, 207, and 209.

Metadata extractor 220 may employ a comparison with OSS ("open source software") governance 223. OSS governance 223 may refer to rules or customs by which open-source software projects decide who gets to do what, or is supposed to do what, how they're supposed to do it, and when. OSS governance 223 may be a database containing rules or customs. Metadata extractor 220 may be configured to extract metadata from one or more build artifacts (203, 205, 207, 209). Metadata extractor 220 may compare extracted metadata from one or more build artifacts (203, 205, 207, and 209) with rules and customs contained within OSS governance 223. If the comparison displays a lack of compliance with a threshold number of rules and customs for OSS governance 223, then metadata extractor 220 may render extracted metadata to be complaint with those rules and customs.

Metadata extractor 220 may provide uploaded artifacts to a code signing module 224, a vulnerability scanner 225, a Vulnerability Disclosure Reports module ("VDR") 226 or a Vulnerability Exploitability Exchange ("VEX") 227. Code signing module 224 may involve digitally signs uploaded artifacts 203, 205, 207, 209 to verify their authenticity and integrity, and ensure the artifact(s) has not been tampered with and comes from a trusted source. Code signing module 224 may involve using public key encryption to affix digital signatures to distributable files. Such a process verifies the identity of the software developer or publisher and confirms that the integrity of the code is intact from the time the code was signed to the time the code was downloaded. Code signing module 224 may work by (1) creating a unique key pair consisting of a public key and a private key; (2) sending the public key to a trusted certificate authority to verify that the key belongs to a rightful owner; (3) retrieving a digitally signed code signing certificate once the public key is certified by the trusted certificate authority; (4) running the code of extracted metadata through a hash function; (5) encrypting an output from the hash function with the private key; (6) combining the output, code signing certificate, and the hash function into a signature block; and (7) making the signature block available to a viewer or to a consumer. When a user downloads the signed software, their system uses the paired public key to decrypt the signature. This process verifies that the software is from a trusted source and has not been tampered with since it was signed.

Vulnerability scanner 225 may identify and assess security vulnerabilities in build artifacts 203, 205, 207, 209. Vulnerability scanner may identify and assess security vulnerabilities by (1) scanning an attack surface (e.g., possible points or attack vectors where an unauthorized user can try to enter data to, extract data from, or control critical software in a given environment) for flaws, coding bugs and errors, anomalies, and default or misconfigured configurations; (2) identifying potential paths attackers can exploit; (3) based on preceding details, searching a vulnerability database and listing what vulnerabilities are likely to exist; (4) scanning for more information about installed software communicated by metadata; and (5) comparing the scanned information with file signatures to determine whether the metadata and the scanned information match with an actual, intended, or legitimate product/output/artifact.

Reports may be provided by VDR 226 to consumers/users of system 200 as text or through another process to make the reports accessible to consumers/users (e.g., a user interface, a download of files, etc.). VDR 226 may be exchanged securely via a portal or registry. VDR 226 may be an attestation of all vulnerabilities affecting a product (e.g., an artifact), or the product's dependencies, along with an analysis of an impact of one or more vulnerabilities. VDR 226 may enable consumers or users to properly complete vulnerability assessments pursuant to a software bill of materials. VDR 226 may also aid consumers or users to conduct risk assessments on installed software or artifacts.

With extracted metadata, VEX 227 may provide users with additional information on whether a product or artifact is impacted by a specific vulnerability in an included component and, if affected, whether there are actions recommended to remediate. VEX 227 may be a format developed as part of the National Telecommunications and Information Administration ("NTIA") Multistakeholder Process for Software Component Transparency. VEX 227 may be a form of a security advisory that communicates the exploitability of components with known vulnerabilities in the context of an artifact. VEX 227 may be an assertion of the status of a vulnerability of a specific artifact. VEX 227 may include machine-readable documents, which enable automation and integration into system 200. Users can integrate component data from sBOMs with vulnerability status information from VEX 227 to provide an up-to-date view of the status of vulnerabilities. VEX 227 may generate documents that are capable of being published in enterprise blockchain 260 and/or downloaded via dependencies from enterprise blockchain 260.

Metadata Extractor 220 may interact with Enhanced SBOM Generator 230. Metadata extractor 220 may send metadata to Enhanced SBOM generator 230. Enhanced SBOM Generator 230 may generate an SBOM 236. Enhanced SBOM Generator may "enhance" SBOM 236 by enriching SBOM 236 with additional information beyond a baseline of information. For example, an "enhanced" SBOM 236 may include details such as the status of known vulnerabilities in the components, licensing information, or other metadata. Enhanced SBOM Generator 230 may include an SBOM Annotator 235, which may review information from one or more databases and add additional metadata, or context, to SBOM 236 based on its review. SBOM 236 may set parameters which can aid in training KYS LLM 240. SBOM 236 may also be published onto enterprise blockchain 260 so that it can be queried by actor 248 and used for building secure artifacts.

One or more of the databases may include the Exploit Prediction Scoring System ("EPSS") 231, Known Exploited Vulnerabilities ("KEV") 232, and the National Vulnerability Database ("NVD") 233. EPSS 231 may be a prediction scoring system which is data-driven and can estimate the likelihood/probability that a software vulnerability will be exploited in system 200. KEV 232 may be software vulnerabilities in software or a system that have been identified and actively exploited by a malicious actor/s. NVD 233 is a U.S. government repository managed by the National Institute of Standards and Technology, which provides detailed information on software vulnerabilities, including descriptions and severity assessments. NVD serves as a key resource (for example, through the databases it provides) for cybersecurity professionals to stay informed and address potential security threats. Using the aforementioned vulnerability information, SBOM annotator 235 may generate or yield a vulnerability score 234. Vulnerability score 234 is a numerical or qualitative measure assigned to a security vulnerability to indicate its severity or potential impact. SBOM annotator 235 may add additional metadata or context to the SBOM 236 throughout the lifetime of system 200. SBOM 236 may be a detailed inventory of software components and their dependencies within the system. SBOM 236 may provide essential information, such as component names, versions, and dependencies, aiding in security assessments and vulnerability management. SBOMs 236 are valuable for tracking and addressing potential security risks associated with software components.

Metadata Extractor 230 aid in training KYS LLM 240 through extracted metadata. Metadata extractor 230 may gather and organize information it extracted, then it may preprocess the information to convert the information into a format that KYS LLM 240 is capable of understanding. Metadata extractor 230 may then input the preprocessed information into KYS LLM 240 and provide additional context throughout the lifetime of system 200. The output of KYS LLM 240 may then be evaluated by a user or actor 248. User or actor 248 may then fine-tune KYS LLM 240 through a query 246. Query 246 may be in a natural language format or a coding language format (e.g., Python).

KYS LLM 240 includes a LLM model 242, which can refer to premade and/or generated library recommendations 244. KYS LLM 244 may be an advanced artificial intelligence model designed to understand and generate human-like text at scale. Library recommendations 244 may be results generated by KSY LLM 240 based on query 246 by user 248. KYS LLM 244 may have the ability to search the internet. KYS LLM 240 may store extracted metadata to broaden its context for future queries. KYS LLM 240 may search online libraries or offline libraries for items pertinent and/or responsive to query 246. KYS LLM 242 may also access and/or navigate libraries provided by enterprises A through D. These libraries may include a database (numerals 202*a*, 202*b*, 202*c*, and 202*d*) each belonging to one of enterprises A through D. KYS LLM 242 may receive and respond to queries by actor 248, of which actor 248 may use the response to query (246*a*) enterprise blockchain 260 for specific aspects of one or more library recommendations 244.

Metadata extractor 220 may publish items and/or dependencies to enterprise blockchain 260 following processing steps (e.g., following processing by any of processors marked by numerals 221 through 227). Metadata extractor 220 may also publish items from, or relating to, SBOM 236. Published items may be queried for by actor 248 to make searching for those items easier, as well making deployment of those items more efficient and secure.

Enterprise blockchain 260 may include a package archiver 262, an IPFS 264 (which may resemble IPFS 160 in FIG. 1), contract instance 268, smart software supply chain contract 270, Application Binary Interface ("ABI") 272, Bytecode 274, address 276 and blockchain 290. Enterprise blockchain 260 may include downloadable dependencies (not shown).

The dependencies may come from sources outside of enterprise blockchain 260. The dependencies may include data dependencies; component dependencies (e.g., a blockchain application might depend on certain software libraries or other components to function properly); cross-blockchain dependencies (i.e., with the advent of multiple blockchain networks, a new type of dependency has emerged where one blockchain can depend on another), which is often seen in decentralized finance applications where assets or data on one blockchain might be dependent on assets or data on another blockchain; transaction dependencies (e.g., a dependency graph may be obtained to represent an order among conflicting transactions); and/or resource dependencies (e.g., reliance on external resources for functional purposes). One or more of the dependencies may be downloaded in a manner appropriate for whichever programming language and whichever package manager is being employed.

Package manifest 263 (also shown in FIG. 6 and may resemble the package manifest in FIG. 1) may provide detailed information about one or more licenses, details of SBOM 236 following its annotation by SBOM annotator 235 (e.g., with a vulnerability score and dependencies). Package manifest 263 may be one or more documents inputted into package archive 262 following publication processes by metadata extractor 220. Package Archiver 262 may compress and combine files and directories published by metadata extractor 220 into a single archive file which may be uploaded to IPFS 264 (which may resemble the IPFS shown in FIG. 1). IPFS 264 may create a peer-to-peer method of storing and sharing the uploaded files in a distributed files system. A CID 291 may be assigned to the files by IPFS 264. The CID may resemble one or more of the CIDs shown in FIG. 1. One or more application programming interfaces ("APIs") may be included in enterprise blockchain 260 to help search, publish, and download packages developed by package archiver 262 from blockchain 290. Package Publish API 292 may facilitate publishing a package in blockchain 290 and making the published package available to entities with authorized access to blockchain 290. Package Search API 293 may facilitate searching for a package in blockchain 290. Package Download API 294 may facilitate downloading a package via the package's CID. The package's CID may then be filed and/or downloaded into IPFS 269. APIs 292 through 294 may be APIs build on top of a contract or a contract instance 268. Contract instance 268 may be a specific occurrence of a smart contract (not shown) deployed on blockchain 290 and may be identified by address 276. A user may interact with contract instance 268 to execute contract functions and update its state in blockchain 290. Address 276 may contain a unique identifier assigned to the smart contract when the smart contract is deployed on blockchain 290. Address 276 may represent a location of the contract's storage and execution within blockchain 290. Enterprise blockchain 260 may be configured to receive metadata and receive a query from actor 248.

Blockchain 290 may be a decentralized and distributed digital ledger that records transactions across a network of computers in a secure and transparent manner. A permission blockchain, in the present disclosure, may have an access control layer that allows external enterprise/vendors to be invited on the blockchain. Smart software supply chain contract 270 may be a program that runs on blockchain 290, automatically enforcing and executing predefined rules and conditions, eliminating the need for an intermediary in transactions. Smart software supply chain contract 270 may run on the Solidity language. Smart software supply chain contract 270 may compile ABI 272. The compilation may occur by writing a smart contract in Solidity, using a compiler to compile the smart contract into a format blockchain 290 can read, and generating ABI 272 during compilation (ABI 272 may be a JSON file that describes the deployed contract and its smart contract functions). ABI 272, also shown in FIG. 4, may specify how binary code components interact, which aids in defining rules for data representation and function calls, thereby ensuring interoperability in the system. ABI 272 may also serve as an interface between smart contracts and applications. ABI 272 may be used via a JavaScript client library and allow actor 248 to call a specific smart contract to a software interface. Smart software supply chain contract 270 may also compile code and/or a bytecode module ("Bytecode") 274. Bytecode 274 may be a low level, platform independent representation of code generated by a compiler, and which may be deployed in blockchain 290. Bytecode 274 may be a form of instruction designed for execution by a software interpreter. Unlike human-readable code, bytecodes may be compact numeric codes, constants, and references that encode a result of a compiler parsing and performing semantic analysis. Bytecode 274 may be used as an intermediate representation of code that is output by language implementations to ease interpretation or reduce hardware/system dependence. That is, Bytecode 274 may enable the same code to run cross-platform on different devices. Bytecode module 274 may be directly executed on a virtual machine (a p-code machine, i.e., interpreter), or it may be further compiled into machine code for better performance. For example, Java and Smalltalk code is typically stored in bytecode format, which is typically then just-in-time ("JIT") compiled to translate the bytecode to machine code before execution. The process of compiling smart software supply chain contract 270 may generate bytecode 274. Bytecode 274 may facilitate deployment of artifacts and/or CIDs into blockchain 290. Bytecode 274 may be configured to deploy code within enterprise blockchain 260 or to blockchain 290.

Enterprise blockchain 260 may interact with an API 295 to facilitate or initiate downloading contents and/or artifacts and/or items associated with CIDs of blockchain 290. A user of system 200 may then use the downloaded information to initiate or implement a continuous integration/continuous deployment pipeline 280 ("CI/CD pipeline," or "pipeline"). Pipeline 280 may deliver one or more applications to consumers through an automated process or method. Pipeline 280 may include phases, including an "install dependencies" phase 280*a*, "build" phase 280*b*, "unit testing" phase 280*c*, and "deploy" phase 280*d*. "Install dependencies" phase 280*a* may include installing necessary dependencies for a desired project based on a download through API 295. Dependencies may be external libraries or modules that the project would need to function correctly. "Build" phase 280*b* may include compiling source code into a runnable instance of software. "Build" phase 280*b* may further include pulling source code from a repository, establishing dependencies, and compiling components into an artifact. "Build" phase 280*b* may also include code analysis and preparing artifacts for later phases. "Unit testing" phase 280*c* may involve unit testing individual components of software to ensure workability. "Unit testing" phase 280*c* may halt pipeline 280 if a test failure occurs therein. "Deploy" phase 280*d* may include releasing an application to make it accessible to end-users. The application may be moved to a server or cloud platform where it will run. The application, through processes of pipeline 280, may contain information from enterprise blockchain 260 (e.g., including extracted metadata from package archiver 262 and constraints set by smart software supply chain contract 270) which ensures that the application is secure from potential attacks and contains constraints set by smart software supply chain contract 270 and/or contract instance 268.

Referring to FIG. 3, there is shown an example of a Solidity smart contract 300. The smart software supply chain contract in FIGS. 1 and 2 (numeral 270 in FIG. 2) may share text in common with Solidity smart contract 300. Solidity is a statically-typed, high-level programming language designed for developing smart contracts that run on the Ethereum Virtual Machine (EVM) or compatible virtual machines. Solidity is an object-oriented language, which means it uses the concept of objects (which can contain data and code to manipulate that data) to design and build applications. Solidity smart contract 300 may be broken down as follows:

pragma solidity ~0.8.0: This line specifies that the code should be compiled with a Solidity compiler version equal to or higher than 0.8.0, but less than 0.9.0123. This ensures that the code is compatible with the latest version of Solidity, but does not break if a new version with breaking changes is released.

struct Vendor { . . . }: This is a struct named Vendor that has two properties: name of type string and addr of type address. A struct in Solidity is a custom data type where variables of diverse data types can be bundled into one variable.

struct Asset { . . . }: This is another struct named Asset with three properties: ctd, name, and size-all of type string.

struct Package { . . . }: This is a struct named Package with five properties: name and version of type string, addr of type address, vendor of type Vendor (which is a struct defined earlier), and releaseDate of type uint.

interface Registry { . . . }: This is an interface named Registry. An interface in Solidity is a list of function definitions without implementation. It allows you to interact with other contracts without having their code.

function getAssets (string memory_name, string memory_version) external view returns (Asset [ ] memory): This is a function declaration inside the Registry interface. The function getAssets takes two parameters_name and_version of type string memory and returns an array of Asset structs. The external keyword means this function can only be called from outside the contract, and view means it does not modify the state of the contract.

function getPackageReleases (string memory_name) external view returns (Package [ ] memory): This function getPackageReleases takes one parameter_name of type string memory and returns an array of Package structs.

function getAllPackages ( ) external view returns (Package [ ] memory): This function getAllPackages does not take any parameters and returns an array of Package structs.

Solidity smart contract 300 may be written by a human being or by another piece of software. Solidity smart contract 300 may be compiled so as to generate bytecode and/or an ABI.

Referring to FIG. 4, there is shown an example of ABI 400. ABI 272 in FIG. 2 have text in common with text of ABI 400. ABI 400 may be for a smart contract in Ethereum. A break down is provided below.

_format: This is the format of the artifact, which is "hh-sol-arti.fact-1" in this case.

contractName: This is the name of the contract, which is "Registry".

sourceName: This is the path to the source file of the contract, which is "contracts/Registry.sol".

address: This is the address of the contract on the Ethereum blockchain, which is "0x5FbDB231567Bafecb367f032dg3f642f64180aa3".

The ABI section describes the interface of the contract. It contains an array of method descriptions. In this case, there's one method described:

name: The name of the function, which is "addPackage".

type: The type of the method, which is "function".

stateMutability: This describes whether and how the function changes the state of the contract. In this case, it's "nonpayable", which means it can't receive Ether.

The function "addPackage" takes four inputs:

1. _name: A string input.
2. _version: Another string input.
3. _vendorName: Yet another string input.
4. _assets: This is a two-dimensional array of strings.

Each input has an internalType, a name, and a type. The internalType and type are usually the same, and they describe the data type of the input. The name is the name of the input.

Figure 5:
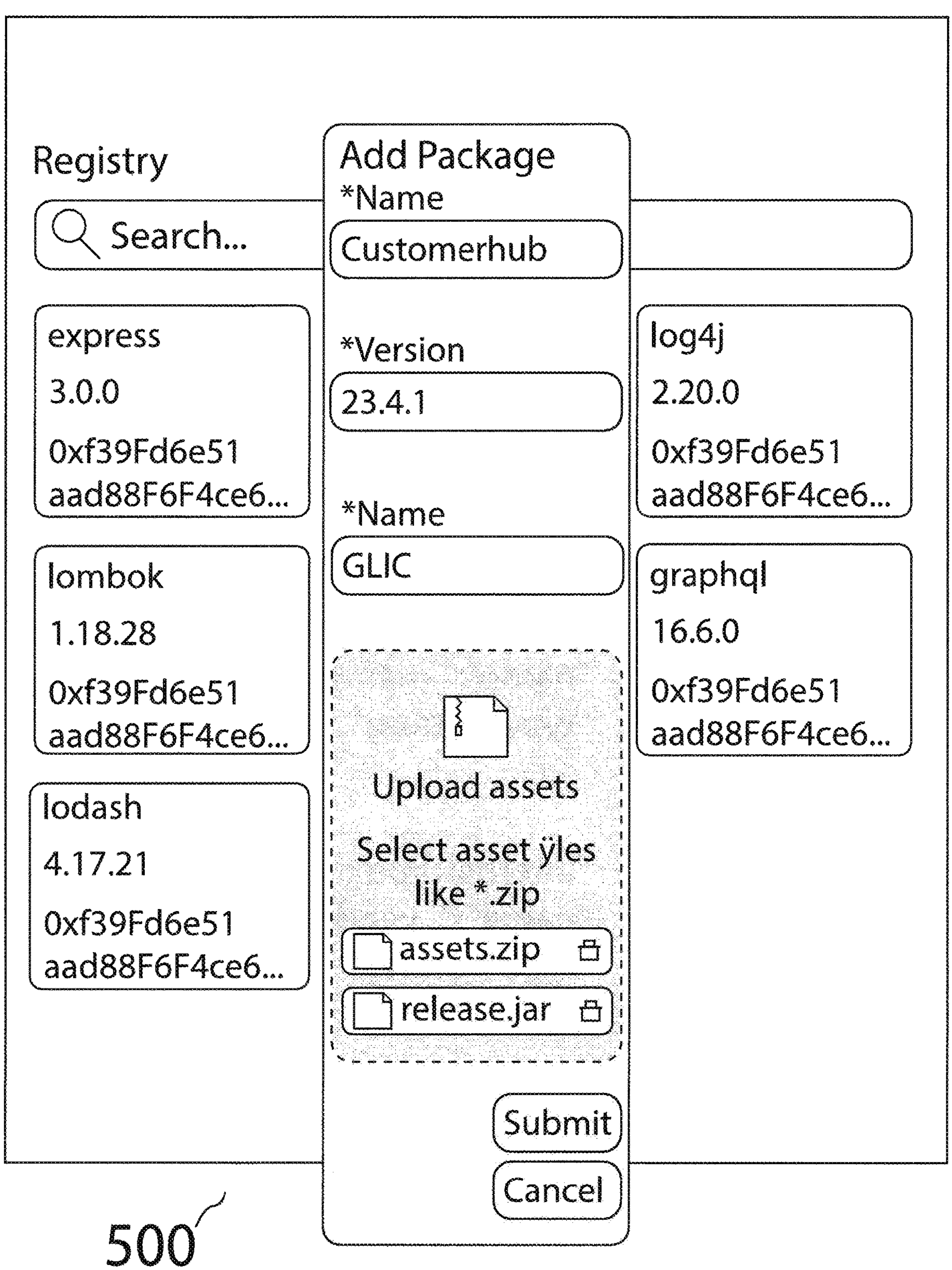
FIG. 5 illustrates an example of an Add Package Interface that may be used in the present disclosure.

Referring to FIG. 5, there is shown an example of an Add Package Interface 500. Add Package Interface 500 may enable an enterprise or a vendor to add a package to blockchain 290. A package name may be required, followed by a package version, vendor name, and an upload of the package in question (e.g., as one or more files in numerous formats, such as .zip and .jar). Add Package Interface 500 may also be implemented to add packages in build artifacts (e.g., build artifacts 203, 205, 207, and 209) for subsequent processing by metadata extractor 220 and enterprise blockchain 260.

Referring to FIG. 6, there is shown an example of a package manifest 600. Package manifest 600 and the package manifest shown in FIG. 1 and package manifest 262 may have text in common with one another. Package manifest 600 may include, for example, the text shown in FIG. 6. The text may communicate information in a structured data format, including JSON. For instance, FIG. 6, when broken down, displays the following information.

Package Name: cutomerhub—This is the name of the software package.

IPFS Content Identifier: QmdK5EyBcCGRXL7gw87qMMA4EEgJxJi9YmkSQ—This is a unique identifier for the content in the Inter-Planetary File System (IPFS).

License: GPLv3—This indicates that the software package is licensed under the GNU General Public License version 3.

Timestamp: 1699041295192—This is the timestamp when the package was created or modified. It's in Unix time format (milliseconds since 1970-01-01T00:00:00Z).

Vulnerability Score: 9.56—This is the score indicating the severity of vulnerabilities found in the package. It's on a scale from 0 to 10, with 10 being the most severe.

Dependencies: This section lists the software packages that cutomerhub depends on. In this case, it depends on log 4j-core version 2.15.0.

CVEs (Common Vulnerabilities and Exposures): This section lists the known vulnerabilities of the dependencies. In this case, log 4j-core version 2.15.0 has a vulnerability identified as CVE-2021-44228.

Severity: HIGH—This indicates that the vulnerability has a high impact on the software.

Impact Score: 10.0—This is the score indicating the potential impact of the vulnerability. It's on a scale from 0 to 10, with 10 being the most severe.

Vulnerability Name: Apache Log4j2 Remote Code Execution Vulnerability—This is the name of the vulnerability. It suggests that an attacker could remotely execute code due to this vulnerability.

EPSS (Exploit Prediction Scoring System): This section provides the exploit prediction score for the vulnerability. In this case, the score for CVE-2021-44228 is 0.974530000, and it's in the 0.999420000 percentile. This means there's a high likelihood of this vulnerability being exploited.

Date: 2023 Oct. 28—This is the date when the vulnerability was discovered or reported.

Figure 7:
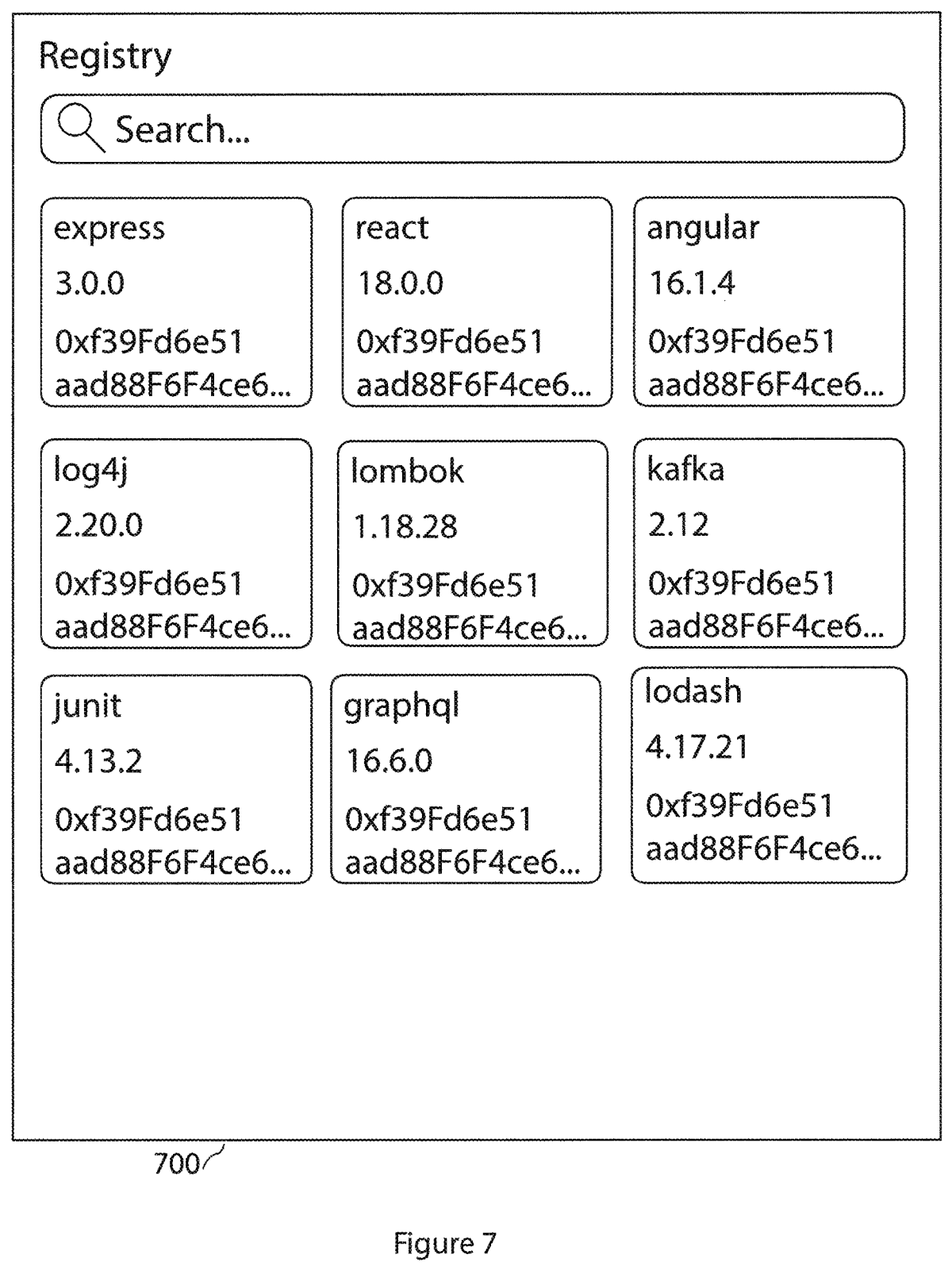

Referring to FIG. 7, there is shown an example of a package registry dashboard 700. Package registry dashboard 700 may display packages in a list format or a grid format. The displayed packages in FIG. 7 are described below.

Express: A fast, minimalist web framework for Node.js. It's used to build web applications and APIs.

React: A JavaScript library for building user interfaces. It allows developers to create large web applications that can change data without reloading the page.

Angular: A platform for building web applications. It provides a way to organize code and comes with tools to help develop, test, and update your application.

Log4j: An industrial-grade Java logging framework. It provides a way to output log statements from applications to various output targets.

Lombok: A Java library that plugs into your editor and build tools, reducing boilerplate code by generating methods like getters, setters, and others automatically.

Kafka: A distributed event streaming platform used for high-performance data pipelines, streaming analytics, data integration, and mission-critical applications.

JUnit: A unit testing framework for Java. It helps ensure the reliability of your code by allowing you to write tests for individual units of source code.

GraphQL: A query language for APIs and a runtime for executing those queries with your existing data. It provides an efficient and powerful alternative to REST.

Lodash: A JavaScript utility library that provides helpful methods for manipulation and combination of arrays, objects, and other data types.

These packages may be accessible by authorized enterprises of system 200 to download from dependencies from enterprise blockchain 260 to build artifacts via pipeline 280.

Figure 8:
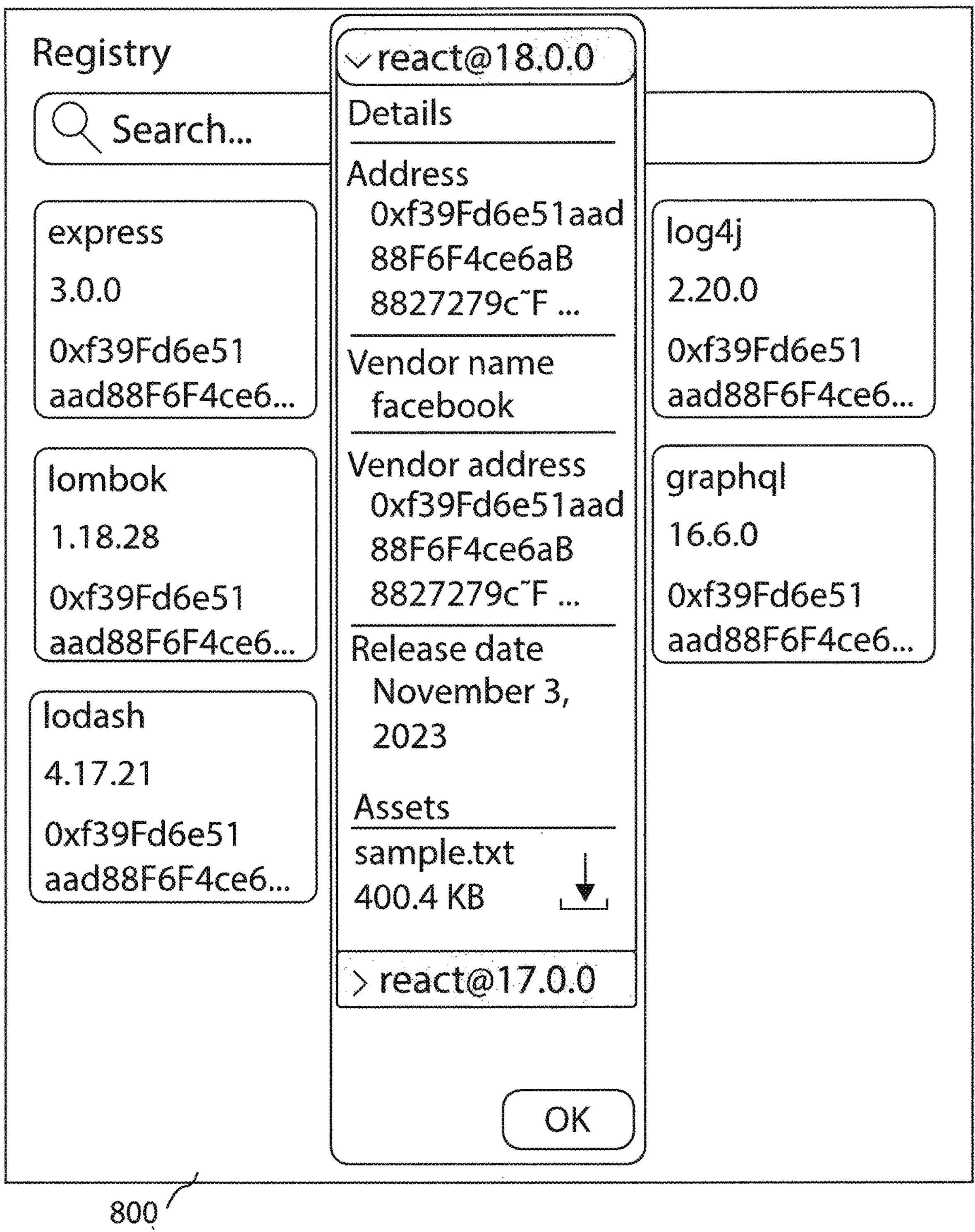
FIG. 8 illustrates an example of Release Timeline and Metadata of the present disclosure.

Referring to FIG. 8, there is shown an example of a release timeline and metadata 800. Release timeline and metadata 800 may be viewed from package registry dashboard 700. Release timeline and metadata 800 may show information about a library (e.g., react@18.0.0, or version 18.0.0 of the React library). The library can then be installed after download via, for example, API 295 of system 200. The library may have an associated address (e.g., similar to address 276), an associated vendor, an associated vendor address, a release date, and an associated asset or file (e.g., sample.txt). Release timeline and metadata 800 may be obtained by a user of system 200 to implement into pipeline 280.

GENERAL

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A system for securing an enterprise's software supply chain, the system comprising:

an enterprise;

a build artifact;

a metadata extractor configured to extract metadata from the build artifact and send the metadata to an enhanced software bill of materials generator;

a know your software large language model configured to be trained by the metadata extracted from the build artifact and to receive a query from an actor, wherein the know your software large language model is configured to search for and generate library recommendations;

an enterprise blockchain configured to receive the metadata and to receive a query from the actor, wherein the enterprise blockchain comprises an application programming interface configured to initiate a download of dependencies from the enterprise blockchain; and a pipeline configured to receive the download of the dependencies from the enterprise blockchain and to deploy information from the download of the dependencies from the enterprise blockchain.

2. The system of claim 1, wherein the metadata extractor further comprises the enhanced software bill of materials generator.

3. The system of claim 1, wherein the enterprise blockchain further comprises a package archiver.

4. The system of claim 1, wherein the enterprise blockchain further comprises an InterPlanetary File System configured to send and receive a content identifier.

5. The system of claim 1, wherein the enterprise blockchain further comprises an application programming interface configured to publish the content identifier to the enterprise blockchain.

6. The system of claim 1, wherein the enterprise blockchain further comprises an application binary interface configured to receive the contract instance and specify rules for data representation.

7. The system of claim 1, wherein the enterprise blockchain further comprises a bytecode module configured to deploy code to a blockchain.

8. The system of claim 7, wherein the enterprise blockchain further comprises an address configured to be located and executed within the blockchain.

9. The system of claim 1, wherein the enterprise blockchain further comprises a smart software supply chain contract configured to compile code.

10. A method for securing an enterprise's software supply chain, the method comprising:

providing an enterprise build artifact;

providing a metadata extractor;

providing a package archiver via the metadata extractor;

providing an InterPlanetary File System;

providing a smart software supply chain contract;

providing a know your software large language model;

providing a blockchain;

sending the enterprise build artifact to the metadata extractor;

extracting metadata of the enterprise build artifact;

training the know your software large language model with extracted metadata;

generating a package manifest;

sending extracted metadata to the package archiver;

archiving the extracted metadata into the InterPlanetary File System via the package archiver;

generating a content identifier based on the archiving of the extracted metadata;

inserting the content identifier into the smart software supply chain contract;

recording the content identifier's insertion into the smart software supply chain contract into the blockchain;

querying the know your software large language model to search for and generate library recommendations; and querying the blockchain to search for content identifiers and aspects of the smart software supply chain contract inputted into the blockchain.

11. The method of claim 10, wherein the method further comprises halting the smart software supply chain contract.

* * * * *